United States Patent
Ye

(10) Patent No.: US 11,664,732 B2
(45) Date of Patent: May 30, 2023

(54) SYNCHRONOUS CLOCK GENERATOR CIRCUIT FOR MULTIPHASE DC-DC CONVERTER

(71) Applicant: DONGGUAN CHANGGONG MICROELECTRONICS LTD, Dongguan (CN)

(72) Inventor: Guanghua Ye, Dongguan (CN)

(73) Assignee: INNOVISION SEMICONDUCTOR INC.

(\*) Notice: Subject to any disclaimer, the term of this patent is extended or adjusted under 35 U.S.C. 154(b) by 27 days.

(21) Appl. No.: 17/339,995

(22) Filed: Jun. 5, 2021

(65) Prior Publication Data

US 2022/0393595 A1 Dec. 8, 2022

(51) Int. Cl.
*H02M 3/158* (2006.01)
*H02M 3/156* (2006.01)

(52) U.S. Cl.
CPC ....... *H02M 3/1586* (2021.05); *H02M 3/1563* (2013.01); *H02M 3/1588* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588;
(Continued)

(56) References Cited

U.S. PATENT DOCUMENTS 6,246,222 B1 \* 6/2001 Nilles ................. H02M 3/1584
  323/283
7,368,959 B1 \* 5/2008 Xu ....................... H02M 3/1584
  327/540

(Continued)

*Primary Examiner* — Thienvu V Tran
*Assistant Examiner* — Nusrat Quddus
(74) *Attorney, Agent, or Firm* — Mark Luo

(57) ABSTRACT

This present invention is an invented synchronous clock generator for the multiphase DC-DC converter system, comprising a front-end buffer circuit, a ramp signal generator circuit, a configurable equally divided reference voltage generator circuit, a set of comparators, a 10-ns pulse generator, multiple 30-ns pulse generators, and a pulse combination circuit. The synchronous clock generator can produce a clock pulse signal SYNC at N (total phase number) times the single-phase switching frequency. Within one synchronous loop period, a 10-ns pulse is first generated and followed by N-1 30-ns pulses. The master power stage chip detects the 10-ns pulse, and all the slave power stages detect and count the 30-ns pulses to determine when to set their output signal PWM. Thus, the invention can produce the new SYNC signal immediately with balanced phase shift while allowing the changing of the total phase number N by the total phase number register.

5 Claims, 5 Drawing Sheets

Circuit Diagram of the Proposed Synchronous Clock Generator

Typical Block Diagram of a 4-Phase Multiphase DC-DC Converter

(58) Field of Classification Search
CPC ....... H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/16; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; H02J 3/46; H02J 3/38

See application file for complete search history.

(56) References Cited

U.S. PATENT DOCUMENTS

| | | | | |
|---|---|---|---|---|
| 8,618,850 | B2* | 12/2013 | Priego | H02M 3/1584 327/147 |
| 9,948,184 | B2* | 4/2018 | Zhang | H02M 3/1584 |
| 2006/0125451 | A1* | 6/2006 | Tabaian | H02M 1/08 323/222 |
| 2006/0212138 | A1* | 9/2006 | Zhang | H02M 3/1584 713/300 |
| 2007/0076452 | A1* | 4/2007 | Schultz | H02J 3/1842 363/72 |
| 2009/0224732 | A1* | 9/2009 | Kudo | H02M 3/1584 323/271 |
| 2010/0156361 | A1* | 6/2010 | Barrenscheen | H02M 3/1584 323/272 |
| 2010/0201405 | A1* | 8/2010 | Ahmad | H02M 3/33561 327/108 |
| 2011/0163785 | A1* | 7/2011 | Chen | G06F 1/04 327/144 |
| 2012/0026754 | A1* | 2/2012 | Ye | H02M 3/285 363/17 |
| 2018/0175721 | A1* | 6/2018 | Li | H02M 1/14 |
| 2019/0074770 | A1* | 3/2019 | Trichy | H02M 1/14 |
| 2020/0100339 | A1* | 3/2020 | Huang | H05B 45/44 |
| 2020/0366203 | A1* | 11/2020 | Mei | H02M 3/33507 |

* cited by examiner

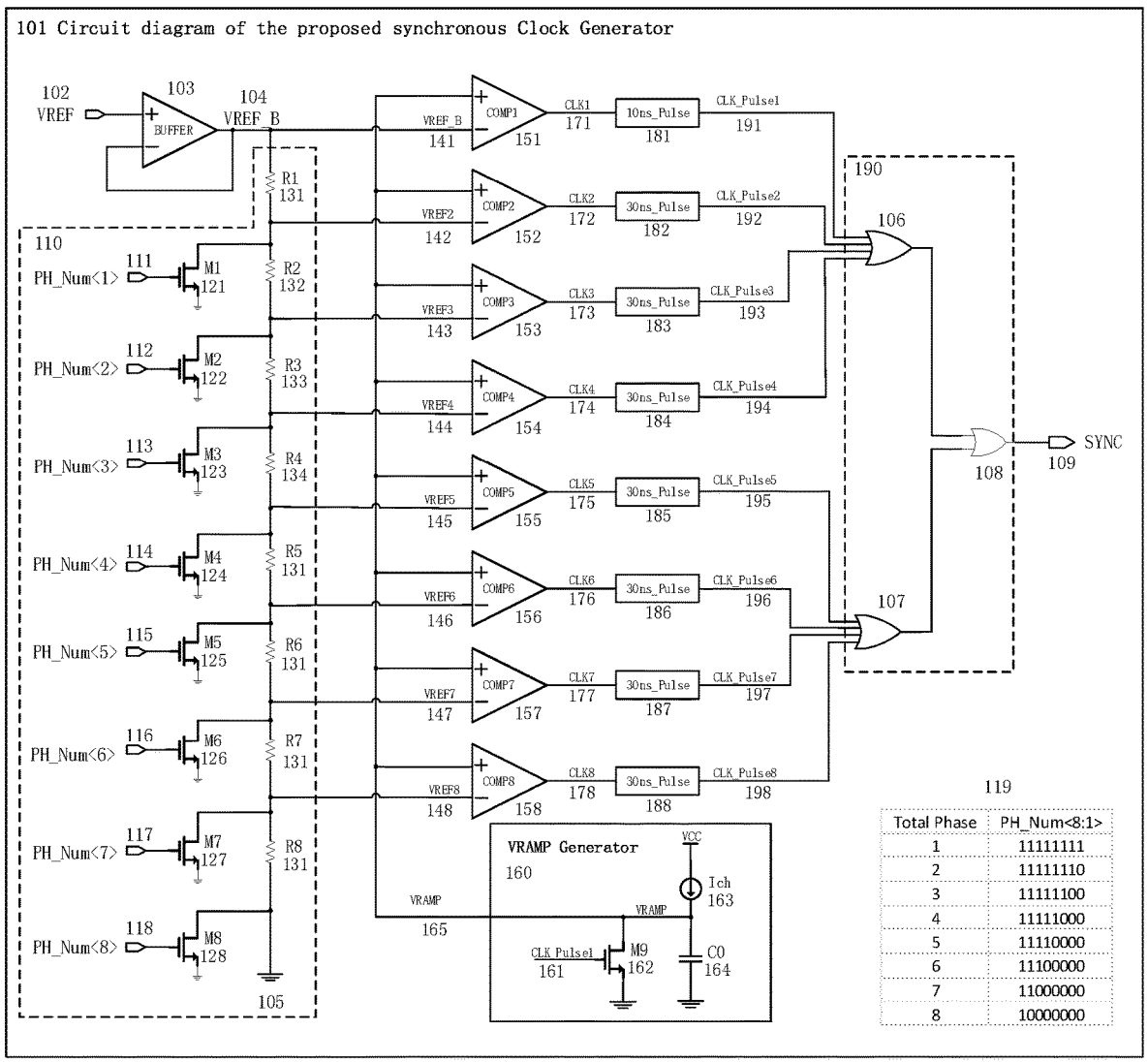
Fig. 1: Circuit Diagram of the Proposed Synchronous Clock Generator

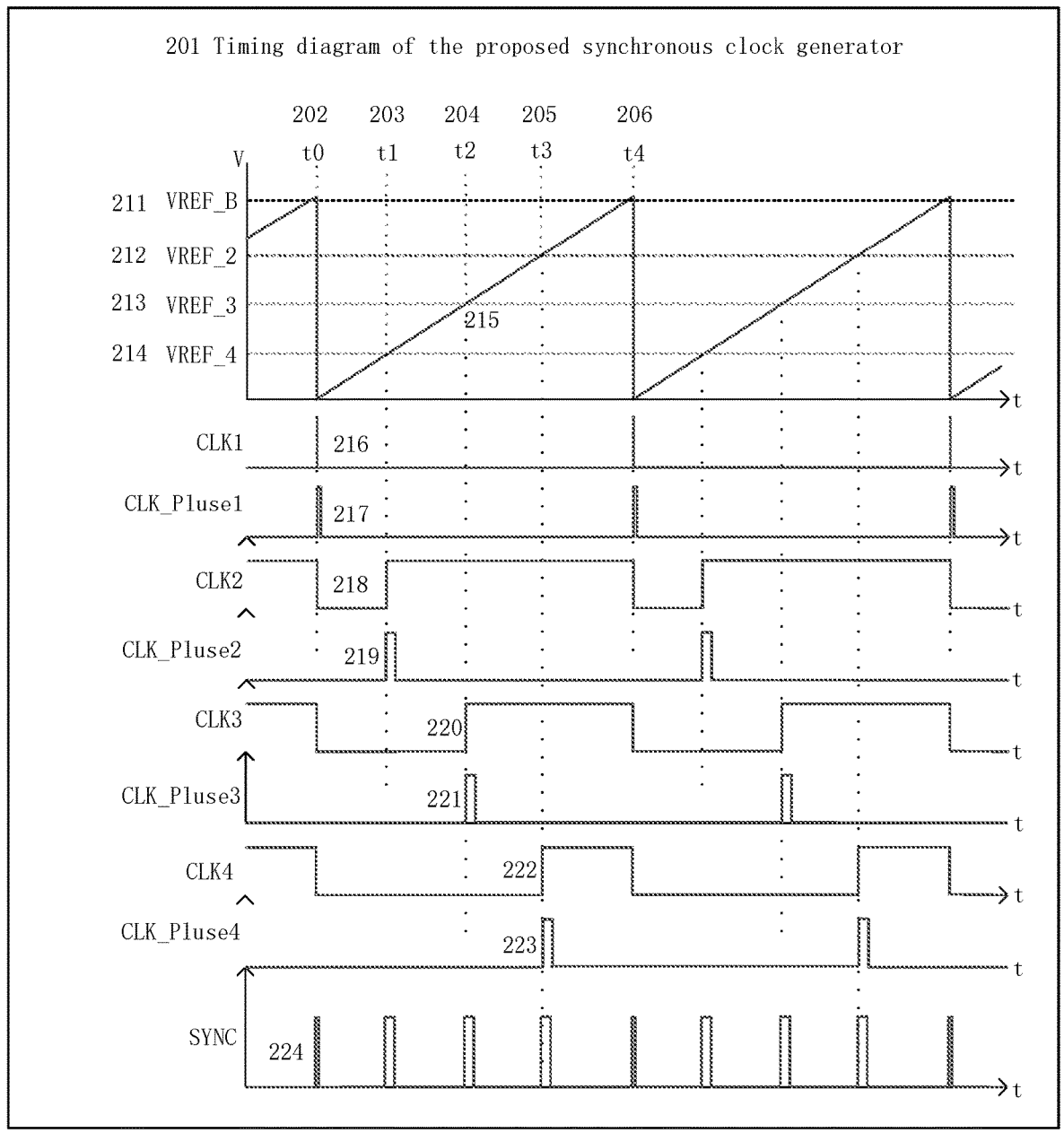
Fig. 2: Timing Diagram of the Proposed Synchronous Clock Generator

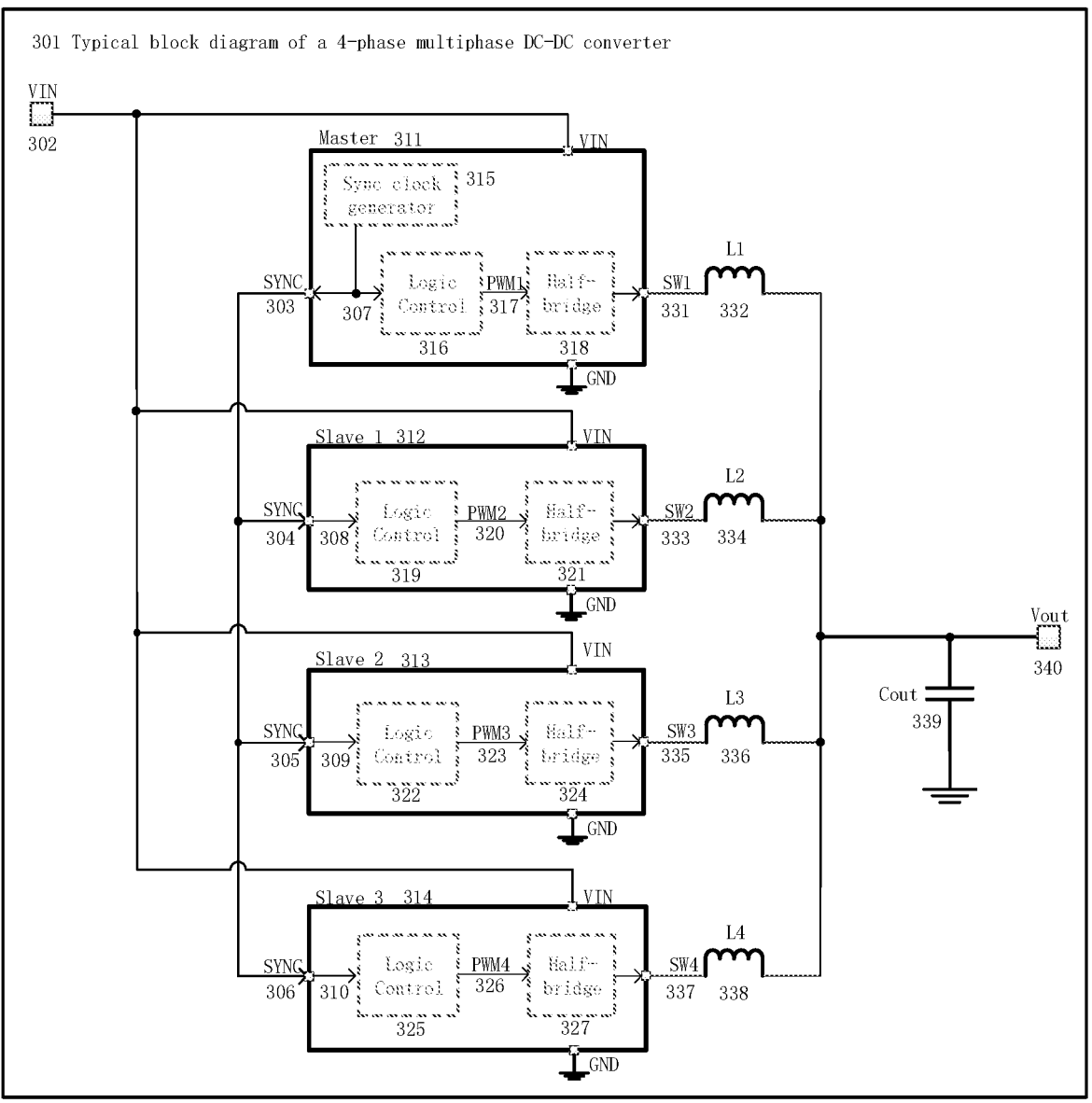
Fig. 3: Typical Block Diagram of a 4-Phase Multiphase DC-DC Converter

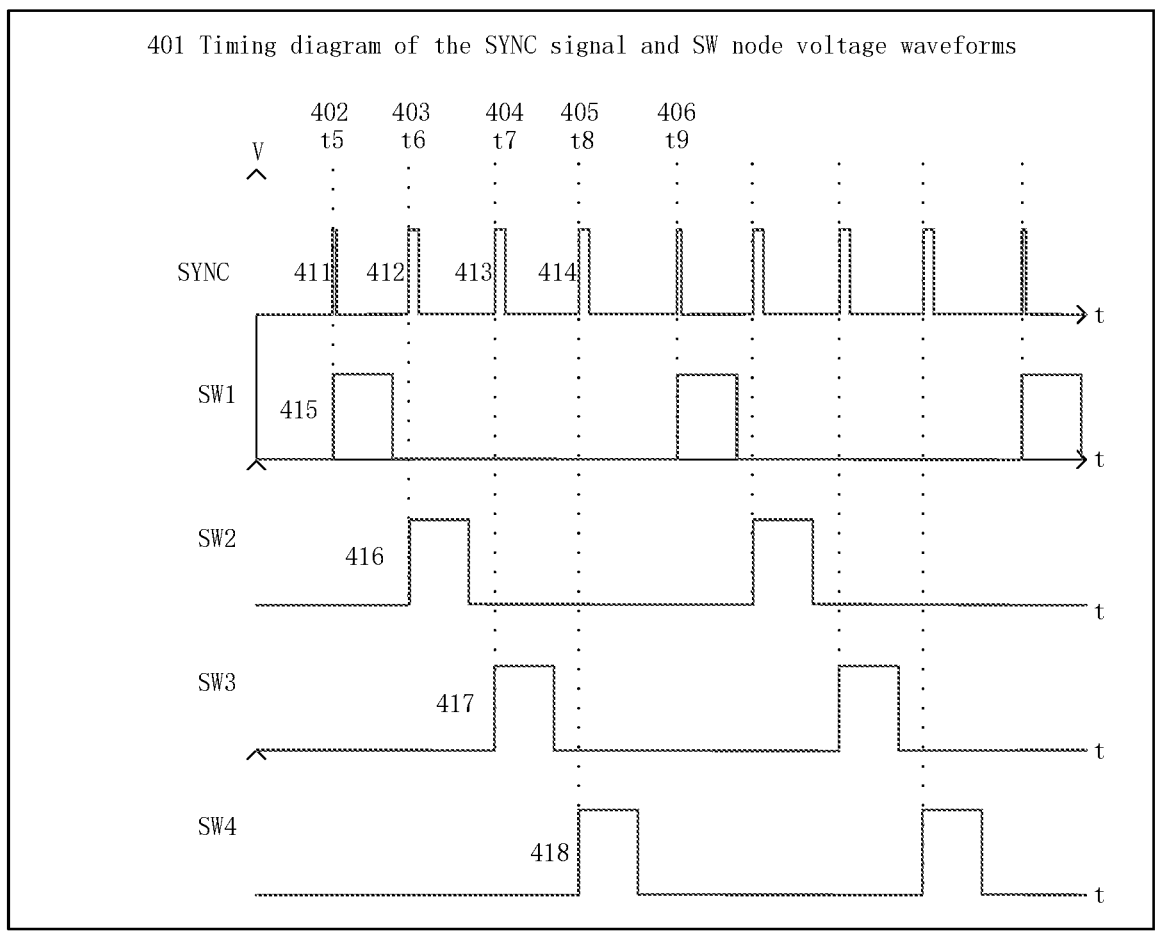
Fig. 4: Timing Diagram of the SYNC Signal and SW Node Voltage Waveforms

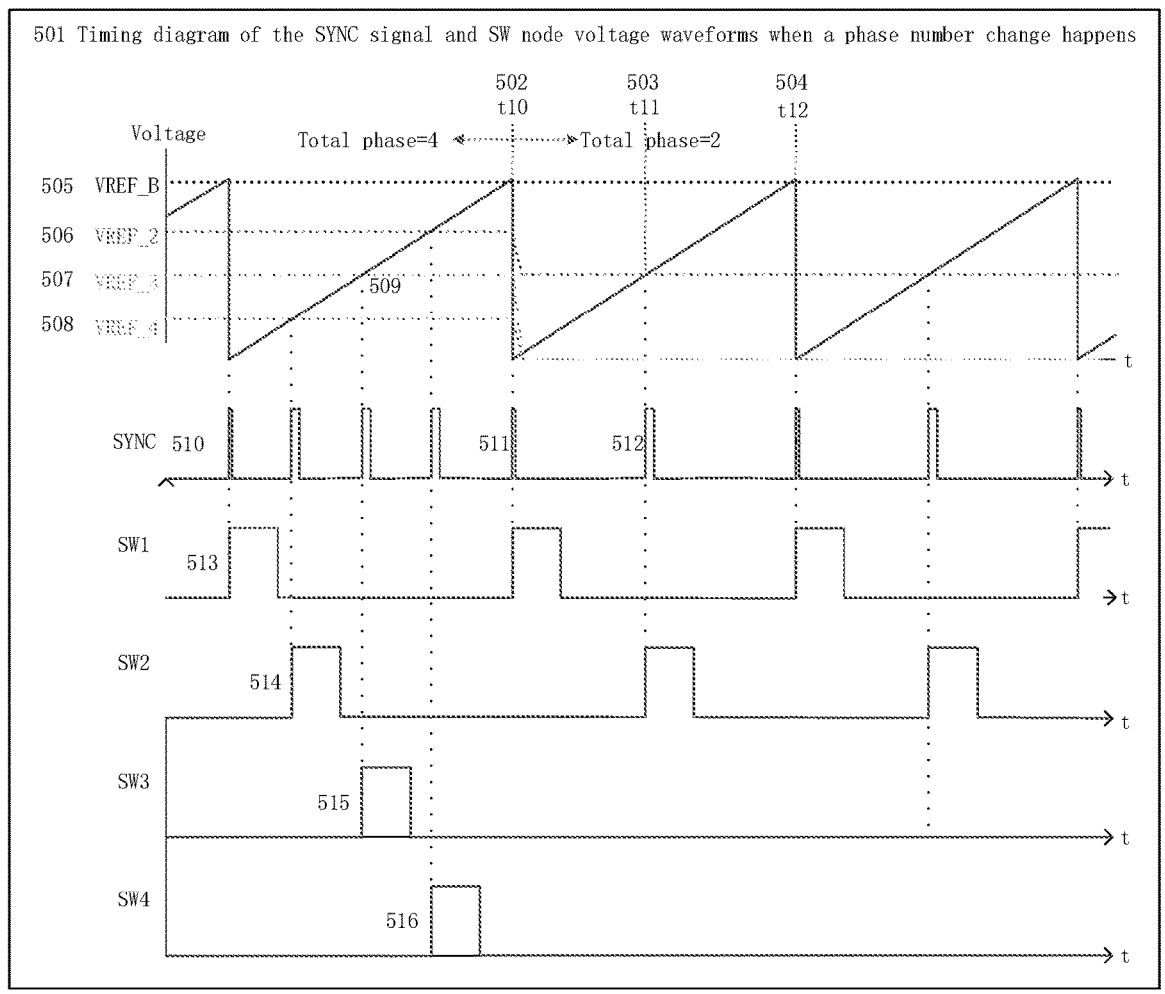
Fig. 5: Timing Diagram of the SYNC Signal and SW Node Voltage Waveforms when a Phase Number Change Happens

SYNCHRONOUS CLOCK GENERATOR CIRCUIT FOR MULTIPHASE DC-DC CONVERTER

TECHNICAL FIELD

The present disclosure relates to a synchronous clock generator circuit and applied for multiphase DC-DC converter, and more particularly on how to obtain stable clock period and balanced phase shift between phases even when the number of phases is dynamically changed.

BACKGROUND

Multiphase DC-DC converter, also called interleaved converter, has been widely used in IT equipment electronic system due to its extraordinary performance in reducing output voltage ripple and response time, especially in low-voltage and high-current load applications such as CPU power and memory chipsets power. Typically, a multiphase DC-DC converter consists of multiple identical DC-DC converters connected in parallel and a centralized controller, which generates the pulse width modulation (PWM) signal for each of the DC-DC converter. The duty ratio of the PWM signal for all the phases are the same, but the controller sequentially adds a T/N phase shift to each phase's PWM signal, where T is the switching period and N is the number of phases. In this way, the output voltage ripple can be significantly reduced. Therefore, a synchronous clock generator circuit is needed inside the controller for generating the required interleaved PWM signal for all phases. The synchronous clock generator takes the original clock signal at the switching frequency $f_{sw}$, for one phase as the input and generates short pulses at N times of $f_{sw}$. However, it needs to identify the "first" pulse, which is aligned with the original clock signal as the "master clock". Moreover, the synchronous clock generator circuit also needs to adjust the phase shift in real-time to adapt the dynamical change of the phase number.

The current technology for implementing the synchronous clock generator circuit for multiphase DC-DC converter can be classified into two categories. For the first category, a ring oscillator circuit is used to directly convert the original clock signal, which is at the single-phase switching frequency $f_{sw}$, to a new clock signal at N times of $f_{sw}$, where N is the phase number. The major disadvantage of this technology is that it needs an additional circuit to identify the master clock and the slave clock. Also, when the single-phase switching frequency goes higher or the phase number goes higher, the ring oscillator's output frequency goes higher and can result in large errors. For the second category, a ring oscillator is used as a buffer to generate a clock signal, the frequency of which is the same as the single-phase switching frequency, $f_{sw}$. Then, a phase-lock-loop (PLL) circuit is used to generate the clock signal at N times of $f_{sw}$. The major issue of this solution is that the circuit implementation is complex. Also, when a phase number change happens during the operation, large errors will be observed within PLL's settling time due to the control-loop's bandwidth and delay.

SUMMARY

In general, this disclosure describes an embodiment of an invented synchronous clock generator circuit for multiphase DC-DC converter. Assuming the phase number is N, the proposed synchronous clock generator circuit comprises a front-end buffer, a ramp signal generator, a voltage reference generator circuit, a set of comparators, a set of pulse generators, and a pulse combination circuit. The voltage buffer generates a reference voltage—VREF_B, which is identical to the input reference voltage—VREF but with enhanced driving capability. The voltage reference generator circuit is used to generate equally divided voltage reference, VREF2-VREFN, based on the configured phase number. It comprises a set of identical resistors connected in series between the VREF_B and the ground. Also, there is a pull-down N-MOSFET connected to each node between two adjacent resistors. In this way, by controlling the on/off state of each N-MOSFET, the circuit can generate reference voltage, VREF2-VREFN, that meets the requirement of configured phase number. The ramp signal generator circuit consists of a constant current source, a capacitor, and an N-MOSFET. The constant current source keeps charging the capacitor to generate the ramp-up voltage signal—VRAMP, which is compared to the reference voltage, VREF_B. The output of the comparator is then fed into a 10-nano-second (ns) pulse generator. This 10-ns pulse generator generates a 10-ns width pulse whenever it detects a rising edge from the comparator's output. The output of the pulse generator, CLK_PULSE1, drives the N-MOSFET that is used for resetting the capacitor. In this way, VRAMP becomes a saw-tooth waveform, which ramps between 0V to VREF_B, and the CLK_PULSE1 signal's frequency is the same as the saw-tooth waveform frequency, which is defined as the synchronous loop frequency. Similarly, for the other voltage references VREF2-VREFN, there is a comparator that compares each voltage reference with the VRAMP signal. The outputs of these comparators are connected to 30-ns pulse generators, which generate the clock pulse signals: CLK_PULSE2-CLK_PULSEN, respectively.

These clock pulse signals along with the original CLK_PULSE1 signal are all at the same frequency but equally interleaved over one period. Finally, these clock pulse signals are combined into the required synchronous clock signal, SYNC, by a set of "OR" gate circuits. Therefore, the 10-ns pulse can be identified as the master clock pulse, and the 30-ns pulse can be identified as the slave clock pulse. Also, the pulse frequency of the signal SYNC is N times of CLK_PULSE1's frequency.

There are two extraordinary features for the proposed synchronous clock generator circuit. First, the synchronous loop frequency is not dependent on the configured number of phases. Therefore, the synchronous clock generator can maintain very stable synchronous loop frequency and equally interleaved phase shift even when the number of phases changes dynamically, which greatly improves the stability of the multiphase DC-DC converter. Second, the master clock signal and the slave clock signal are distinguished by their different pulse width. No additional signal is needed to identify the master clock so that the total number of pins are reduced, and the circuit layout is simplified.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a circuit diagram illustrating the proposed synchronous clock generator.

FIG. 2 is the timing diagram illustrating the operation of the proposed synchronous clock generator.

FIG. 3 illustrates an application example of a typical 4-phase multiphase DC-DC converter with the proposed synchronous clock generator.

FIG. 4 is a timing diagram illustrating the SYNC signal and the SW node voltage waveforms for the 4-phase multiphase DC-DC converter with the proposed synchronous clock generator.

FIG. 5 is a timing diagram illustrating the timing diagram when a phase number change happens.

DETAILED DESCRIPTION

FIG. 1 is a circuit diagram illustrating the proposed novel synchronous clock generator for multiphase DC-DC converter application 101. The circuit diagram shows a typical configuration which can support at most 8-phase operation, but the maximum supported phase number can be extend to any number by properly adding extra components to the proposed circuit. Generally, the proposed synchronous clock generator comprises a front-end buffer 103, a ramp signal generator circuit 160, a configurable voltage reference generator circuit 110, a set of comparators 151-158, a set of pulse generators 181-188 and a pulse combination circuit 190. The front-end buffer 103 is a voltage follower circuit, which generates the voltage signal, VREF_B 104, that tracks the input voltage reference signal, VREF 102, but with higher driving capability. The ramp signal generator circuit 160 includes an N-MOSFET 162, a constant current source 163 and a capacitor 164. The constant current source 163 keeps charging the capacitor 164 to generate a ramp-up voltage signal. The N-MOSFET 162 is driven by a clock pulse signal 161 to periodically reset the capacitor. The configurable voltage reference generator circuit 110 includes eight identical resistors 131-138 and eight N-MOSFETs 121-128. The eight resistors are connected in series from VREF_B 104 to the ground 105 to generate equally divided voltage references: VREF2-VREF8 142-148. The eight N-MOSFETs' drain pins are connected to the node between the two adjacent resistors, respectively, and their source pins are connected to the ground. Also, the eight N-MOSFETs 121-128 are controlled by a register named PH_Num. Each N-MOSFET is controlled by one digit of the registers 111-118. The N-MOSFET is turned on when the corresponding digit is "1" and turned off when it is "0". Therefore, the total number of the resistors in series can be configured by properly turning on or off some of the N-MOSFETs. The mapping between the total phase number in operation and PH_Num's register value is shown in table 119. The voltage reference VREF2-VREF8 142-148 along with the voltage reference VREF_B are compared with the ramp signal VRAMP 165 by eight comparators 151-158. The compared results are eight channels of clock signals, CLK1-CLK8 171-178, and they are fed into eight short pulse generators 191-198, which generates a short pulse when each short pulse generator detects a rising edge from the input. Specifically, the first short pulse generator 181 for CLK1 171 is a 10-ns pulse generator, which generates the clock pulse signal, CLK_PULSE1 191, and such clock pulse signal is identified as the master clock. This master clock pulse signal is also used to drive the N-MOSFET 162 to reset the ramp signal generator's capacitor 164. The rest of the seven pulse generators 182-188 are all 30-ns pulse generators, which generate the clock pulse signals: CLK_PULSE2-CLK_PULSE8 192-198, respectively. Finally, the pulse combination circuit combines all the clock pulse signals, CLK_PULSE1-CLK_PULSE8 191-198, by two 4-to-1 OR gates 106-107 and one 2-to-1 OR gate 108 to generate the desired SYNC signal 109.

FIG. 2 is the timing diagram illustrating the operation of the proposed synchronous clock generator 201. This figure shows an example when the phase number is "4" to simplify the description, but the operation principle is not limited to this phase number and can apply to any phase number if needed. Thus, when the phase number is "4", the value of the register PH_Num is "11111000" in binary format, which indicates that M4 124, M5 125, M6 126, M7 127, and M8 128 are on, and M1 121, M2 122, and M3 123 are off. Therefore, the voltage reference VREF5=VREF6=VREF7=VREF8=0V, and VREF2 212, VREF3 213, VREF4 214 are at ¾ VREF_B, ½ VREF_B and ¼ VREF_B, respectively. According to the circuit diagram shown in FIG. 1, the signal ramp signal VRAMP 215 is compared with the voltage reference VREF_B 211, VREF2 212, VREF3 213, and VREF4 214, respectively and outputs of the four comparators are signals CLK1 216, CLK2 218, CLK3 220, and CLK4 222. Then, the pulse generator converts the signals CLK1, CLK2, CLK3 and CLK4 into short pulse signals CLK_PULSE1 217, CLK_PULSE2 219, CLK_PULSE3 221 and CLK_PULSE4 223, respectively. The detailed description of the timing diagram is as follows:

Right before $t_0$ 202, VRAMP 215 surpasses VREF_B 211, and the CLK1 216 is set. The pulse generator 181 detects the rising edge of CLK1 216 and generates a 10-ns pulse as its output CLK_PULSE1 191. This short pulse of CLK_PULSE1 217 will turn on the N-MOSFET 162 and discharge the capacitor 164. Therefore, the signal VRAMP 215 drops to 0V, and all clock signals CLK1 216, CLK2 218, CLK3 220 and CLK4 222 are pulled down to 0V at $t_0$. From $t_0$ 202 to $t_1$ 203, the constant current source 163 keeps charging the capacitor 164 and VRAMP 215 ramps up. When VRAMP surpasses VREF_4 214, CLK2 218 is set by the comparator 152, and a 30-ns pulse is generated by the pulse generator 182 as its output CLK_PULSE2 192. Therefore, a 30-ns pulse is observed on signal CLK_PULSE2 219 at $t_1$ 203. From $t_1$ 203 to $t_2$ 204, the constant current source 163 keeps charging the capacitor 164, and VRAMP 215 keeps ramping up. When VRAMP surpasses VREF_3 213, CLK3 220 is set by the comparator 153, and a 30-ns pulse is generated by the pulse generator 183 as its output CLK_PULSE3 193. Therefore, a 30-ns pulse is observed on signal CLK_PULSE3 2221 at $t_2$ 204. From $t_2$ 204 to $t_3$ 205, the constant current source 163 keeps charging the capacitor 164, and VRAMP 215 keeps ramping up. When VRAMP surpasses VREF_2 212, CLK4 222 is set by the comparator 154, and a-30 ns pulse is generated by the pulse generator 184 as its output CLK_PULSE4 194. Therefore, a 30-ns pulse is observed on signal CLK_PULSE4 223 at $t_3$ 205. From $t_3$ 205 to $t_4$ 206, VRAMP 215 keeps ramping up and surpasses VREF_B 211 at $t_4$ 206 eventually. All the signals are reset to their states at $t_0$, and a new period will start. The period from $t_0$ to $t_4$ is defined as the synchronous loop period. Finally, all the clock pulse signals CLK_PULSE1 217, CLK_PULSE2 219, CLK_PULSE3 221 and CLK_PULSE4 223 are OR'ed to generate the SYNC signal 224. Since the pulse width of each pulse is short, there are four short pulses within one period, and the time interval between two pulses is a quarter of a synchronous loop period. Also, there are always three 30-ns pulses followed by one 10-ns pulses on the SYNC signal.

FIG. 3 illustrates an application example of a typical 4-phase multiphase DC-DC converter with the proposed synchronous clock generator 301. As shown, there is one master power stage chip 311 and three slave power stage chips 312-314. These four power stage chips are supplied by the VIN terminal 302 and their SW pins 331, 333, 335 and 337 are connected to four inductors 332, 334, 336 and 338. The other terminals of inductors are lumped together to form the output port, Vout 340, and there is a bulk filter capacitor 339 connected at the output Vout to filter out the high frequency current ripple. The proposed synchronous clock generator circuit 315 is implemented in the master power stage chip 311. The master power stage's SYNC pin 303 is an output terminal, and the slave power stage's SYNC pin 304, 305 and 306 are input terminals. Thus, the synchronous clock generator 315 on the master power stage chip can generate the SYNC signal and send it to all the other slave power stage chip through SYNC terminals. Also, there is a logic control block in each power stage chip 316, 319, 322 and 325. For the master chip, the logic control block 316 will set the PWM1 signal 317 once it detects a 10-ns pulse from its input 307. For the slave chip, the logic control is programmed by a pre-assigned phase number. In this case, slave 1 312 is programmed with "1", slave 2 313 is programmed with "2" and slave 3 314 is programmed with "3". Then, the logic control of all the slave chips detects the 10-ns pulse from its input and starts to count the number of 30-ns pulses it has received since then. Once the number of pulses counted equals to the pre-assigned number, it will set its PWM output. For example, once slave 2 313 has detected a 10-ns pulse at its SYNC terminal 305, it will ignore the first 30-ns pulse but will set the PWM3 signal 323 once it detects the second 30-ns pulse. The PWM signals 317, 320, 323 and 326 are used to drive the half-bridge blocks 318, 321, 324 and 327 in all the power stage chips. The output of the half-bridge block is connected to the SW terminal of each power stage chip. The SW pin is connected to the VIN pin through high-side N-MOSFET when the PWM signal is high as opposed to being connected to the ground pin through low-side N-MOSFET when the PWM signal is low.

FIG. 4 is a timing diagram illustrating the SYNC signal and the SW node voltage waveforms for the 4-phase multiphase DC-DC converter with the proposed synchronous clock generator 401. The detail of the timing diagram is illustrated as follows:

At $t_5$ 402, the synchronous clock generator generates a 10-ns pulse on its output SYNC 411. The logic control block 316 in the master power stage chip 311 detects this 10-ns pulse 411 and sets its output PWM1 317. The half-bridge block receives this PWM1 signal and turns on its high-side N-MOSFET. Therefore, the SW1 voltage 415 is pulled to the VIN potential at $t_5$ 402. The logic control blocks in all the other slave power stage chips 319 322 325 also receive the 10-ns pulse and reset their pulse counts to "0".

At $t_6$ 403, the synchronous clock generator generates the first 30-ns pulse 412 after the 10-ns pulse. The logic control block 316 in the master power stage chip 311 detects this 30-ns pulse 412 but will take no action. The logic control block 319 of the first slave power stage chip 312 detects this 30-ns pulse and sets its output PWM2 320. The half-bridge block receives this PWM2 signal and turns on its high-side N-MOSFET. Therefore, the SW2 voltage 416 is pulled to the VIN potential at $t_6$ 403. The logic control blocks of the second and the third slave power stage chips 322, 325 also receive the 30-ns pulse at $t_6$ but will take no action.

At $t_7$ 404, the synchronous clock generator generates the second 30-ns pulse 413 after the 10-ns pulse. The logic control block 316 in the master power stage chip 311 detects this 30-ns pulse 413 but will take no action. The logic control block 322 of the second slave power stage chip 313 detects this 30-ns pulse and sets its output PWM3 323. The half-bridge block receives this PWM3 signal and turns on its high-side N-MOSFET. Therefore, the SW3 voltage 417 is pulled to the VIN potential at $t_7$ 404. The logic control blocks of the first and the third slave power stage chips 319 325 also receive the 30-ns pulse at $t_7$ but will take no action.

At $t_8$ 405, the synchronous clock generator generates the third 30-ns pulse 414 after the 10-ns pulse. The logic control block 316 in the master power stage chip 311 detects this 30-ns pulse 414 but will take no action. The logic control block 325 of the third slave power stage chip 314 detects this 30-ns pulse and sets its output PWM4 326. The half-bridge block receives this PWM4 signal and turns on its high-side N-MOSFET. Therefore, the SW4 voltage 418 is pulled to the VIN potential at $t_8$ 405. The logic control blocks of the first and the second slave power stage chips 319 322 also receive the 30-ns pulse at $t_8$ but will take no action.

At $t_9$ 406, the synchronous clock generator generates another 10-ns pulse after a full synchronous loop period, and the timing diagram from $t_5$ 402 to $t_9$ 406 will repeat.

FIG. 5 is a timing diagram illustrating the timing diagram when a phase number change happens 501. The detail of the timing diagram is illustrated as follows:

Before $t_{10}$ 502, the total phase number is "4", the voltage waveforms of SW1 513, SW2 514, SW3 515, and SW4 516 are interleaved at 90 degrees. This time interval has been illustrated in detail in the previous figure.

At $t_{10}$ 502, the total phase number is changed to "2" by setting the register PH_Num<8:1>119 to 11111110 in binary format. At this moment, M2 122 and M3 123 are turned on, and VREF_3 507 and VREF_4 508 are pulled to the ground potential. Also, VREF_2 506 drops to the potential at VREF_B/2 since there are only two resistors, R1 131 and R2 132, sharing the voltage of VREF_B 505. Meanwhile, the synchronous clock generator generates a 10-ns pulse on its output SYNC 510. The logic control block 316 in the master power stage chip 311 detects this 10-ns pulse 511 and sets its output, PWM1 317. The half-bridge block receives this PWM1 signal and turns on its high-side N-MOSFET. Therefore, the SW1 voltage 513 is pulled to the VIN potential at $t_{10}$ 502. The logic control blocks in all the other slave power stage chips 319, 322, and 325 also receive the 10-ns pulse and reset their pulse counts to "0".

At $t_{11}$ 503, the synchronous clock generator generates the first 30-ns pulse 512 after the 10-ns pulse. The logic control block 316 in the master power stage chip 311 detects this 30-ns pulse 512 but will take no action. The logic control block 319 of the first slave power stage chip 312 detects this 30-ns pulse and sets its output PWM2 320. The half-bridge block receives this PWM2 signal and turns on its high-side N-MOSFET. Therefore, the SW2 voltage 514 is pulled to the VIN potential at $t_{11}$ 503. The logic control blocks of the second 322 and the third 325 slave power stage chips also receive the 30 ns pulse at $t_{11}$ but will take no action.

At $t_{12}$ 504, the synchronous clock generator generates another 10-ns pulse after a full synchronous loop period, and the timing diagram from $t_{10}$ 502 to $t_{12}$ 504 will repeat.

As described, after the total number phase is changed from "4" to "2" during the operation, the total number of pulses within one synchronous loop is also changed from "4" to "2". Also, only the master chip and the first slave chip will switch after $t_{10}$, and their waveforms are interleaved in 180-degrees phase shift. This proves that the proposed synchronous clock generator can ensure the stability and balanced phase shift when a dynamic phase change happens during the operation.

Those skilled in same field will also appreciate that various adoption and modifications of alternative embodiments described above can be configured in same or similar concept and spirit of the disclosure. Therefore, it is to be understood that, within the scope of the claims, the disclosure may be practiced other than as specifically described herein. For example, some schemes may be implemented using different semiconductor process or packaging techniques.

The exemplary embodiments were chosen and described in order to better explain the principles of the invention and the most possible practical application, and to help peers with ordinary skill in the art to understand the disclosure for various embodiments with possible modifications. Various changes in an actual implementation may be made although above exemplary embodiments have been used. In addition, many modifications may be made to adapt a specific application or to a particular system, to the teachings of the disclosure without departing from the essential scope thereof. Therefore, the disclosure not be limited to the exemplary embodiments disclosed for implementing this disclosure. Moreover, all of derived or evolved embodiments be covered within the scope of the appended claims. In addition, the reference, definition, and terminology used herein are for the purpose of describing specific embodiments only and are not intended to be limiting of the disclosure.

What is claimed is:

1. A multiphase DC-DC converter system, comprising:
    a master power stage chip, which draws power from its input terminal Vin, generates the synchronous clock signal at its output pin SYNC, and produces desired PWM signal at its output SW pin, and wherein the master power stage chip further comprises:
        a synchronous clock generator block to produce the synchronous clock pulse signal SYNC, which includes both 10-ns pulse for the master chip and 30-ns pulse for the slave chips;
        an output terminal connected to the output of the synchronous clock generator block SYNC;
        a logic control block, wherein the logic control block receives the SYNC signal and detects the 10-ns pulse, and logic control block's output signal PWM is set immediately once the logic control block detects the 10-ns pulse; and
        a half-bridge block, wherein the half-bridge block comprises a half-bridge circuit formed by two N-MOSFETs connected in totem-pole configuration along with a gate driver as a bridge coupled between the half-bridge circuit and PWM signal;
    two or more slave power stage chips, wherein each slave power stage chip draws power from its input terminal Vin, receives the synchronous clock signal from its input pins SYNC, and produces desired PWM signal at its output SW pin;
    two or more inductors, wherein, each inductor's one terminal is connected to either the master or slave power stage chip's SW pin while the other terminal of all the inductors are lumped together to form the output terminal Vout; and
    one or more output voltage filter capacitors, wherein the output voltage filter capacitor is connected between the output terminal Vout and the ground terminal for filtering out the high frequency current ripple and can be implemented by one single capacitor or by paralleling multiple capacitors.

2. The synchronous clock generator block of claim 1, wherein the synchronous clock generator block further comprises:
    a front-end buffer circuit;
    a voltage divider circuit formed by multiple identical resistors connected in series from the output of the buffer circuit to the ground terminal to generate equally divided reference voltage;
    two or more N-MOSFETs, wherein each N-MOSFET's drain terminal is connected to a certain node between two adjacent resistors and its source terminal is connected to the ground pin;
    a total phase number configuration register to control the on/off state of the aforementioned N-MOSFETs, wherein each bit of the register controls one specific N-MOSFET;
    a ramp voltage signal generation circuit, which includes a constant current source, a capacitor and an N-MOSFET, wherein the constant current source keeps charging the capacitor and the N-MOSFET is controlled by a clock pulse signal to reset the capacitor periodically;
    a comparator to compare the ramp voltage signal to the output of the buffer;
    a 10-ns pulse generator to convert the compare result between the ramp signal and the output of the buffer, wherein the 10-ns pulse generator will produce a 10-ns width pulse whenever it detects a rising edge on the compare result;
    multiple comparators to compare the ramp voltage signal to each of the equally divided reference voltage signal generated by the voltage divider circuit;
    multiple 30-ns pulse generators to convert the compare result between the ramp signal and all the equally divided voltage reference, wherein the 30-ns pulse generator will produce a 30-ns width pulse whenever it detects a rising edge on the compare result; and
    a logic circuit to OR all the output of the pulse generator to form the SYNC signal.

3. The logic control block of claim 1, wherein the logic control block further comprises a 10-ns pulse detect circuit to set the PWM signal whenever it detects a 10-ns($\pm$2 ns) pulse.

4. The multiphase DC-DC converter system of claim 1, wherein the slave power stage chip further comprises:
    an input terminal SYNC;
    a logic control block to receive the SYNC signal, detect the 30-ns pulse, and set the output signal PWM immediately when the 30-ns pulse is detected; and
    a half-bridge block, comprising a half-bridge circuit formed by two N-MOSFETs connected in totem-pole configuration along with a gate driver as a bridge coupled between the half-bridge circuit and PWM signal.

5. The logic control block of claim 4, wherein the logic control block further comprises:
    a pulse counter;
    a sequence number register that is programmed by the user;
    a 10-ns pulse detect circuit that resets the pulse counter to "0" whenever it detects a 10-ns($\pm$2 ns) pulse on its input;
    a 30-ns pulse detect circuit that counts a "1" to the pulse counter whenever it detects a 30-ns($\pm$2 ns) pulse on its input;

a digital comparator that compares the pulse counter and the sequence number register, wherein the comparator outputs high if the pulse counter and the sequence number are equal; and a logic circuit that detects the output of the digital comparator and sets the output signal PWM whenever a rising edge is detected at the digital comparator's output.

* * * * *